United States Patent
Jo et al.

(10) Patent No.: US 10,291,305 B2
(45) Date of Patent: May 14, 2019

(54) BEAM TRAINING METHOD AND DEVICE IN COMMUNICATION SYSTEM

(71) Applicant: Samsung Electronics Co., Ltd, Gyeonggi-do (KR)

(72) Inventors: Ohyun Jo, Seoul (KR); Chang-Yeul Kwon, Gyeonggi-do (KR); Jae-Hwa Kim, Gyeonggi-do (KR); Dong-Hwi Roh, Seoul (KR); Hyun-Moo Kim, Gyeonggi-do (KR); Dong-Hyuck Park, Gyeonggi-do (KR); Jong-Ho Oh, Gyeonggi-do (KR); Sung-Rok Yoon, Seoul (KR); Seok-Yong Lee, Seoul (KR); Sang-Hyun Chang, Seoul (KR); Do-Young Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 15/035,212

(22) PCT Filed: Nov. 5, 2014

(86) PCT No.: PCT/KR2014/010574
§ 371 (c)(1),
(2) Date: May 6, 2016

(87) PCT Pub. No.: WO2015/069015
PCT Pub. Date: May 14, 2015

(65) Prior Publication Data
US 2016/0277087 A1   Sep. 22, 2016

(30) Foreign Application Priority Data
Nov. 6, 2013   (KR) .................. 10-2013-0133898

(51) Int. Cl.
*H04B 7/06* (2006.01)
*H04B 17/309* (2015.01)
(Continued)

(52) U.S. Cl.
CPC ......... *H04B 7/0617* (2013.01); *H04B 7/0408* (2013.01); *H04B 7/0619* (2013.01); *H04B 17/309* (2015.01)

(58) Field of Classification Search
CPC .. H04B 7/0617; H04B 17/309; H04B 7/0408; H04B 7/0619
See application file for complete search history.

(56) References Cited

U.S. PATENT DOCUMENTS 6,895,258 B1   5/2005 Scherzer et al.
8,611,288 B1 * 12/2013 Zhang ................. H04B 7/0619
                                                        370/235
(Continued)

FOREIGN PATENT DOCUMENTS

| EP | 2342837 A1 | 7/2011 |
| WO | 2010052519 A1 | 5/2010 |
| WO | WO 2013/154584 A1 | 4/2012 |

OTHER PUBLICATIONS

Cordeiro et al. "Motivation and Requirements on 60GHz Beamforming", IEEE 802.11-09/1153r2, Nov. 2009, pp. 1-13.*

(Continued)

*Primary Examiner* — Sophia Vlahos

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present invention relates to a method and an apparatus in a communication system. A method of a network node in the communication system comprises the steps of: measuring at least one factor value indicating channel link performance of (Continued)

a channel link between the network node and another network node; identifying a beamforming training scheme based on the at least one factor value; and performing beamforming training with the another network node by means of the selected beamforming training method, thereby finding an optimal beam for maintaining services through the most efficient method according to a channel state and minimizing the time consumed for beamforming training.

17 Claims, 6 Drawing Sheets

(51) Int. Cl.
*H04B 7/04* (2017.01)
*H04B 7/0408* (2017.01)

(56) References Cited

U.S. PATENT DOCUMENTS

| | | | | |
|---|---|---|---|---|
| 2003/0228857 A1* | 12/2003 | Maeki | ............. | H01Q 1/246 455/278.1 |
| 2010/0159845 A1* | 6/2010 | Kaaja | ............. | H04B 7/088 455/70 |
| 2010/0214169 A1 | 8/2010 | Kafle | | |
| 2012/0009880 A1* | 1/2012 | Trainin | ............. | H04W 24/00 455/67.11 |
| 2012/0220239 A1* | 8/2012 | Hosoya | ............. | H04B 7/0617 455/63.4 |
| 2012/0287797 A1 | 11/2012 | Basson et al. | | |
| 2013/0017836 A1 | 1/2013 | Chang et al. | | |
| 2013/0089000 A1 | 4/2013 | Hansen et al. | | |
| 2013/0156120 A1 | 6/2013 | Josiam et al. | | |
| 2014/0055302 A1* | 2/2014 | Jia | ............. | H01Q 3/34 342/372 |
| 2015/0103756 A1* | 4/2015 | Sinha | ............. | H04B 7/0491 370/329 |

OTHER PUBLICATIONS

International Search Report dated Jan. 26, 2015 in connection with International Application No. PCT/KR2014/010574; 5 pages.
Written Opinion of the International Searching Authority dated Jan. 26, 2015 in connection with International Application No. PCT/KR2014/010574; 4 pages.
Carlos Cordeiro et al., "PHY/MAC Complete Proposal Specification", IEEE 802.11-10/0433r0, May 2, 2010, 336 pages.
IEEE Standard for Information Technology, Part 11: Wireless LAN Medium Access Control (MAC) and Physical Layer (PHY) Specifications, Dec. 28, 2012, 628 pages.
Cordeiro, Carlos, et al., "PHY/MAC Complete Proposal Specification," IEEE 802.11-10/0433r2, May 20, 2010, retrieved from Internet: URL:/http://www.ieee802.org/11/Reports/tgadupdate.htm, 336 pages.
European Patent Office, "Supplementary European Search Report," Application No. EP 14 86 0312, dated Jun. 2, 2017, 10 pages.
Office Action dated Oct. 10, 2018 in connection with European Patent Application No. 14 860 312.9, 8 pages.

* cited by examiner

| | FIRST REFERENCE (EVM) | SECOND REFERENCE (SINR) | THIRD REFERENCE (RSSI) | FOURTH REFERENCE (PER) | FIFTH REFERENCE (Tput) |
|---|---|---|---|---|---|
| BEAMFORMING TRAINING PERFORMING CONDITION | $EVM_{th1}$ | $SINR_{th1}$ | $RSSI_{th1}$ | $PER_{th1}$ | $Tput_{th1}$ |
| FIRST BEAMFORMING TRAINING SELECTION CONDITION | $EVM_{th2}$ | $SINR_{th2}$ | $RSSI_{th2}$ | $PER_{th2}$ | $Tput_{th2}$ |
| SECOND BEAMFORMING TRAINING SELECTION CONDITION | $EVM_{th3}$ | $SINR_{th3}$ | $RSSI_{th3}$ | $PER_{th3}$ | $Tput_{th3}$ |
| BEAMFORMING TRAINING REPETITION CONDITION | $EVM_{th4}$ | $SINR_{th4}$ | $RSSI_{th4}$ | $PER_{th4}$ | $Tput_{th4}$ |

FIG.3

BEAM TRAINING METHOD AND DEVICE IN COMMUNICATION SYSTEM

CROSS-REFERENCE TO RELATED APPLICATION(S)

The present application claims priority under 35 U.S.C. § 365 to International Patent Application No. PCT/KR2014/010574 filed Nov. 5, 2014, entitled "BEAM TRAINING METHOD AND DEVICE IN COMMUNICATION SYSTEM", and, through International Patent Application No. PCT/KR2014/010574, to Korean Patent Application No. 10-2013-0133898 filed Nov. 6, 2013, each of which are incorporated herein by reference into the present disclosure as if fully set forth herein.

TECHNICAL FIELD

The present disclosure relates to a beamforming training scheme in a communication system supporting beamforming.

BACKGROUND ART

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There recently has been ongoing research for introducing a communication technology in a super-high frequency band of 30 Ghz or higher, that is, a millimeter wave system, as a scheme for providing a high data transmission rate. In the millimeter wave system, a serious propagation path loss occurs and significantly decreases the cell coverage. Therefore, in order to solve the problem of propagation path loss in the millimeter wave system, there has been active research for applying a beamforming technique, which improves the transmission/reception efficiency of an antenna by concentrating transmission/reception power in a narrow space.

Generally, in a communication system supporting beamforming, a mobile station and base station have to perform a beamforming training process for finding an optimal uplink transmission/reception beam and downlink transmission/reception beam, respectively. To this end, 802.11ad standards have various beamforming protocols defined with respect to beam training schemes for finding optimum beams, but specific schemes for applying various beamforming protocols have not yet been presented.

DETAILED DESCRIPTION OF THE DISCLOSURE

Technical Problem

Accordingly, an embodiment of the present disclosure provides a method and a device for selecting a beamforming training scheme based on a channel state in a communication system supporting beamforming.

Another embodiment of the present disclosure provides a method and a device for determining whether or not to repeatedly perform beamforming training based on a channel state in a communication system supporting beamforming.

Another embodiment of the present disclosure provides a method and a device for adaptively adjusting the size of a beam width based on a beamforming training scheme in a communication system supporting beamforming.

Another embodiment of the present disclosure provides a method and device for adaptively adjusting the size of a beam width based on whether a beamforming training scheme is repeatedly performed or not in a communication system supporting beamforming.

Another embodiment of the present disclosure provides a method and a device for selecting a beamforming training scheme, based on a preset condition, in order to guarantee a channel state and service quality in a communication system supporting beamforming.

Technical Solution

According to an embodiment of the present disclosure, a method for a network node in a communication system include measuring at least one factor value indicating a performance of a channel link between the network node and another network node, identifying a beamforming training scheme based on the at least one factor value, and performing beamforming training with the another network node according to the identified beamforming training scheme.

According to an embodiment of the present disclosure, an apparatus of a network node in a communication system comprises at least one transceiver; and at least one processor operatively coupled to the at least one transceiver, wherein the at least one processor is configured to measure at least one factor value indicating a performance of a channel link between the network node and another network node; identify a beamforming training scheme based on the at least one factor value; and perform beamforming training with the another network node according to the selected beamforming training scheme.

Advantageous Effects

The present disclosure is advantageous in that, by selecting a beamforming training scheme based on a channel state in a communication system and by adaptively adjusting the size of a beam width based on the beamforming training scheme and whether beamforming training is repeatedly performed or not, it is possible to find an optimal beam for maintaining services, based on the most efficient scheme, according to a channel situation and to minimize the time consumed for beamforming training.

BRIEF DESCRIPTION OF THE DRAWINGS

FIG. 3 is a diagram illustrating an exemplary table for selecting a beamforming training scheme according to an embodiment of the present disclosure;

DETAILED DESCRIPTION OF THE DISCLOSURE

Figure 1:
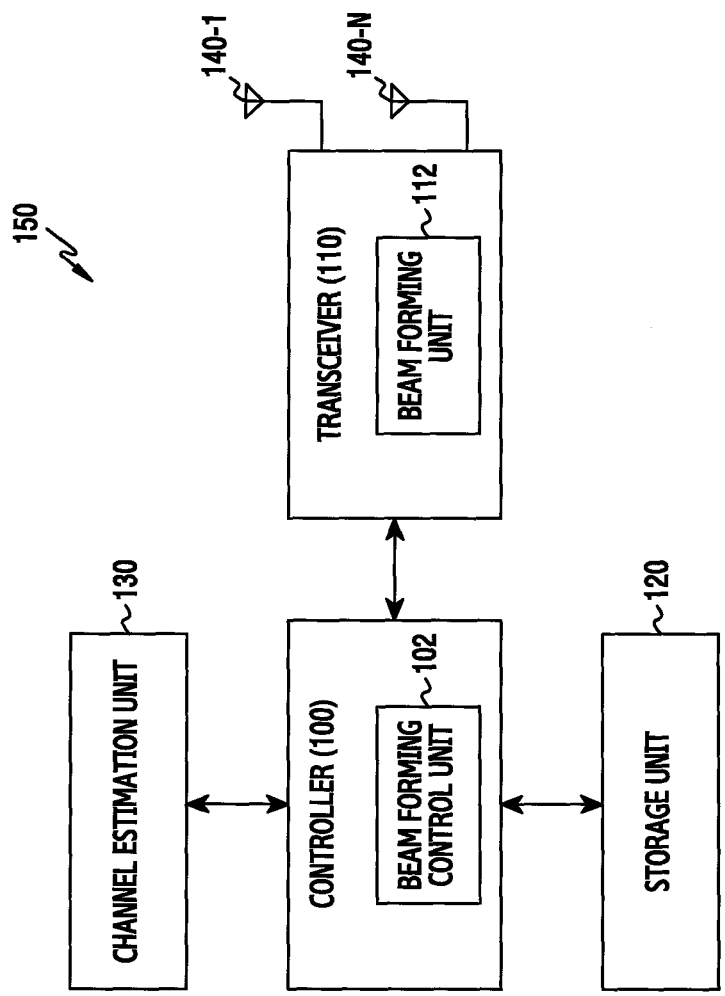
FIG. 1 is a diagram illustrating a block diagram of a network node in a beamforming system according to an embodiment of the present disclosure.

Hereinafter, various embodiments of the present disclosure will be described more fully in conjunction with the accompanying drawings. The present disclosure may have various embodiments, and modifications and changes may be made therein. Therefore, the present disclosure will be described in detail with reference to particular embodiments shown in the accompanying drawings. However, the description is not intended to limit the present disclosure to the specific embodiments, and it shall be appreciated that all the changes, equivalents and substitutions belonging to the idea and technical scope of the present disclosure are included in the present disclosure. In connection with descriptions of the drawings, like reference numerals designate like elements.

As used in various embodiments of the present disclosure, the expressions "have", "may have", "include" or "may include", and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

In various embodiments of the present disclosure, the expression "A or B" or "at least one of A or/and B" includes any or all of combinations of words listed together. For example, the expression "A or B" or "at least A or/and B" may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms as used in various embodiments of the present disclosure are merely for the purpose of describing particular embodiments and are not intended to limit the various embodiments of the present disclosure. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in the present disclosure.

In addition, the present specification will be described in connection with a wireless communication network, and operations performed in the wireless communication network may be performed in the process of controlling the network and transmitting data by a system (e.g. base station) which is in charge of the corresponding wireless communication network, or performed by a mobile station coupled to the corresponding wireless network.

A wireless communication system according to an embodiment of the present disclosure includes multiple base stations (BS). Each base station provides a communication service with regard to a specific geographical area (generally referred to as a cell). A cell may be divided into the multiple areas (also referred to as sectors).

A mobile station (MS) may be fixed or have mobility, it may be denoted by other terms such as an UE (user equipment), an MT (mobile terminal), a UT (user terminal), an SS (subscriber station), a wireless device, a PDA (personal digital assistant), a wireless modem, a handheld device, etc.

The base station generally refers to a fixed station communicating with a mobile station, and may also be denoted by other terms such as an eNB (evolved-NodeB), a BTS (Base Transceiver System), an access point, etc.

The following description will be directed to a scheme for selecting a beamforming training scheme on the basis of a channel state in a communication system that supports beamforming and adaptively adjusting the size of a beam width on the basis of the beamforming training scheme and whether beamforming training is repeatedly performed or not. In the following description, a network node is to be interpreted as including any device, such as a base station, a mobile station, a repeater, or the like, which can configure a network, which has a beamforming antenna, and which can perform beamforming training.

Hereinafter, embodiments of the present disclosure will be described with regard to beamforming protocols defined by 802.11ad standards, for example. It will be assumed, for example, in the following description of embodiments of the present disclosure that a beamforming training scheme is selected from SLS (Sector Level Sweep), BRP (Beam Refinement Protocol), and BT (Beam Tracking), which are defined by 802.11ad standards on the basis of channel situations. However, it would be obvious that the following embodiments of the present disclosure may also be applied to beamforming protocols of different schemes that search for beams to be used for transmission/reception. The SLS is a protocol for performing link detection in a 802.11ad system, and is a beamforming training scheme configured such that network nodes continuously transmit/receive a frame, which includes identical information, while changing only the direction of a beam and select a beam direction, which has the best index (for example, SNR (Signal to Ratio), RSSI (Received Signal Strength Indicator), etc.) that indicates the performance of the reception channel link from successfully received frames. The BRP is a protocol for precisely adjusting a beam direction, which has been determined by the SLS or another means, such that the data transmission rate can be maximized; and beamforming training is performed using a BRP frame, which has been defined for the PRP protocol, and which includes beamforming training information and training result report information. For example, the BRP is a beamforming training scheme wherein a BRP frame is transmitted/received using a beam determined by previous beamforming training, and beamforming training is substantially performed using a beamforming training sequence included in the end portion of the successfully transmitted/received BRP frame. There may be a difference in that the SLS uses a frame itself for beamforming training, while the BRP uses only a beamforming training sequence. The BT (Beam Tracking) is a protocol capable of simultaneously performing data transmission and beamforming training, and refers to a beamforming training scheme wherein beamforming training information is included in the PHY header of a data frame, and a sequence for beamforming training is included in the end portion of the data frame, thereby performing beamforming training concurrently with transmitting data.

FIG. 1 illustrates a block configuration of a network node in a beamforming system according to an embodiment of the present disclosure.

Referring to FIG. 1, a network node 150 may include a controller 100, a transceiver 110, a storage unit 120, and a channel estimation unit 130.

The controller 100 performs a control function for overall operation of the network node 150. The controller 100 may include a beamforming control unit 102 according to an embodiment of the present disclosure. The beamforming control unit 102 selects a beamforming training scheme on the basis of a channel state and performs a function for adaptively adjusting the size of a beam width, which is to be used for beamforming training, on the basis of the beamforming training scheme and whether beamforming training is repeatedly performed or not.

To be more specific, the beamforming control unit 102 may communicate with another network node, detect a change in performance of a channel link while a service is provided, determine whether or not to perform beamforming training on the basis of at least one channel quality estimation value indicating the performance of the channel link, and select a beamforming training scheme. For example, when a change in performance of the channel link is detected while providing a service, the minimum requirement of which is MCS level n, the beamforming control unit 102 may measure at least one channel quality factor (or parameter), which indicates the performance of the channel link, and may compare the measured channel quality factor with a reference value (or reference channel quality factor value) that has been set with respect to a beamforming training performing condition included in a pre-stored beamforming training scheme selection table, as illustrated in FIG. 3, thereby determining whether or not to perform beamforming training. When the measured channel quality factor value satisfies a reference value that has been set with respect to the beamforming training performing condition, the beamforming control unit 102 may determine that the situation requires beamforming, may compare at least one channel quality factor indicating the performance of the channel link with reference values that have been set with respect to first and second beamforming training selection conditions included in a beamforming training scheme selection table, and may select a beamforming training scheme from SLS, BRP, and BT. In addition, the beamforming control unit 102 may compare at least one channel quality factor value, which indicates the performance of the channel link, with a reference value that has been set with respect to a beamforming training repetition condition, which is included in a beamforming training selection table, thereby determining whether or not to repeatedly perform beamforming training. In this case, reference values regarding respective conditions in such a beamforming training scheme selection table as illustrated in FIG. 3 may be set on the basis of the required service quality. For example, reference values regarding a first beamforming training selection condition may be set as channel quality factor values that satisfy level n of MCS (Modulation and Coding Scheme); and reference values regarding a second beamforming training selection condition may be set as channel quality factor values that satisfy level 0 of MCS. Although embodiments of the present disclosure will be described with regard to EVM (Error Vector Magnitude), SINR (Signal to Interference and Noise Ratio), RSSI (Received Signal Strength Indication), PER (Packet Error Rate), and Tput (Throughput) as examples of the channel quality factors that indicate the performance of the channel link, it is also possible to use other channel quality factors that indicate the performance of the channel link.

In addition, the beamforming control unit 102 may detect a situation, which requires beamforming training, in every preset beamforming training period and may select a beamforming training scheme in the same manner as described above.

Figure 4A:
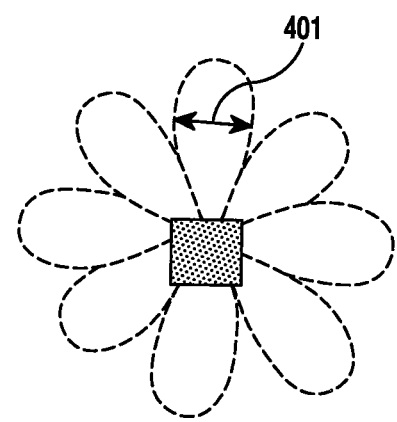
FIG. 4A and FIG. 4B are diagrams illustrating a beam width size which is adaptively changed according to an embodiment of the present disclosure.
Figure 4B:
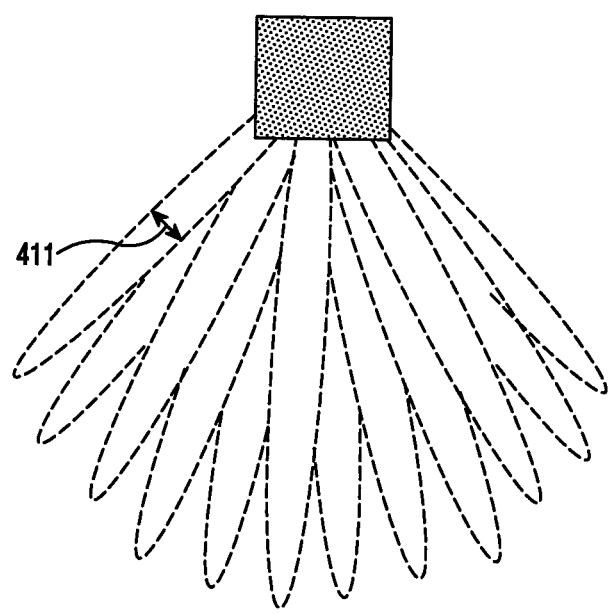

Furthermore, the beamforming control unit 102 may adaptively change a beam width size, which is to be used for beamforming training, on the basis of the beamforming training scheme and whether beamforming training is repeatedly performed or not. For example, the beamforming control unit 102 may define the beam width size of a transmission/reception antenna in multiple steps such that a suitable beam width size can be determined according to the beamforming training scheme and, when the beamforming training scheme is to be performed repeatedly, may determine to use a beam width size, which is smaller than the beam width size used for initial beamforming training. It will be assumed, for example, that the beam width size is defined in two steps: the beamforming control unit 102 then may define a beam width size of a transmission/reception antenna as the beam width size of a first step, which has a beam width size 401 as illustrated in FIG. 4A and as a beam width size of a second step, which has a beam width size 411 as described in FIG. 4B. The beamforming control unit 102 may determine to use the beam width size of the first step, in the case of SLS beamforming training and BRP beamforming training, and may determine to use the beam width size of the second step, in the case of BT beamforming training. In addition, the beamforming control unit 102 may determine, when SLS beamforming training and/or BRP beamforming training is to be repeatedly performed, to use the beam width size of the second step, which is smaller than the beam width size of the first step, for the repeated beamforming training. It would be obvious that, although it has been assumed that the beam width size is defined in two steps for convenience of description, the beam width size can be defined in more than two steps by the system designer. It would also be obvious that the beam width sizes used during SLS beamforming training, BRP beamforming training, and BT beamforming training are exemplary, and the beam width sizes used during respective beamforming trainings may be set differently according to the design scheme. Additionally, the beamforming training may be repeatedly performed multiple times according to beamforming training repetition conditions, which have been set by the system designer, and the channel link state, and the beamforming control unit 102 may make a determination such that, every time it is determined to repeatedly perform beamforming training, the beam width size, which is to be used for beamforming training, is smaller than the beam width size used for previous beamforming training.

In order to perform beamforming training with the selected beamforming training scheme and the determined beam width size, the beamforming control unit 102 controls the beamforming unit 112 so as to form multiple transmission/reception beams that have directionalities different from each other with the determined beam width size, transmits/receives a beamforming training signal, according to the selected beamforming training scheme, using formed transmission/reception beam, and controls and processes a function for selecting an optimal transmission/reception beam. For example, the beamforming control unit 102 may generate a beamforming vector for forming a transmission beam and/or a reception beam, which have the determined beam width size, and may provide the generated beamforming vector to the beamforming unit 112.

The transceiver 110 transmits/receives a signal through multiple antennas 140-1 to 140-N under the control of the controller 100. The transceiver 110 may be configured to include the beamforming unit 112. Additionally, although not illustrated in the drawings, the transceiver 110 may be configured to include multiple encoders, multiple modulators, multiple subcarrier mappers, and multiple RF transmitters. The beamforming unit 112 may form a beam for transmitting/receiving a signal with another network node using a beamforming vector that is provided by the controller 100. In this connection, the beamforming unit 112 may form a transmission/reception beam, which is requested by the controller 100, by using at least one among digital beamforming, beamforming for physically moving an antenna, antennas corresponding to respective beam directions that have been defined in advance, antenna bundles, and antenna arrays.

The storage unit 120 stores various kinds of data and programs required for overall operation of the network node 150. The storage unit 120, according to the present embodiment, may store such a beamforming training scheme selection table as illustrated in FIG. 3. The beamforming training scheme selection table may include at least one reference value indicating a condition which is used to determine whether or not to perform beamforming training, at least one reference value indicating a condition which is used to select a beamforming training scheme, and at least one reference value indicating a condition which is used to determine whether or not to repeatedly perform beamforming training. In this case, the condition which is used to select a beamforming training scheme may be classified into multiple conditions according to the number of beamforming training selection schemes, and, the beamforming training scheme selection table, in this connection, may include at least one reference value with respect to each of the multiple beamforming training selection conditions. For example, in order to select three beamforming training schemes as illustrated in FIG. 3, the beamforming training scheme selection table may include reference values regarding five channel quality factors, with respect to each of two beamforming training selection conditions.

The channel estimation unit 130 estimates at least one channel quality factor, which indicates the performance of a channel link, using a signal (e.g. a pilot signal, a sounding signal, and a data signal) received from another network node, under the control of the controller 100, and provides the beamforming control unit 102 with the at least one estimated channel quality factor.

Figure 2:
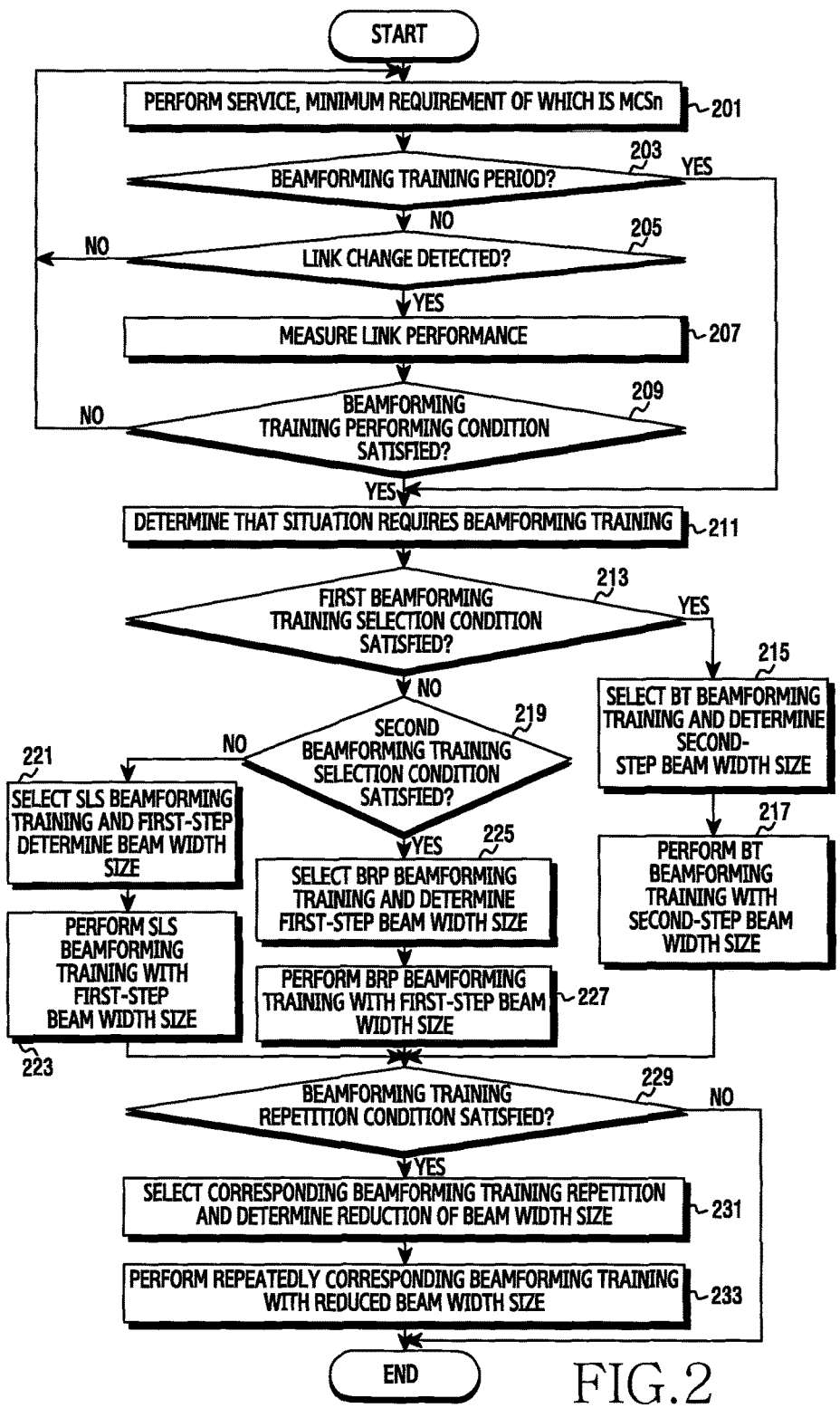
FIG. 2 is a diagram illustrating a beamforming procedure of a network node in a beamforming system according to an embodiment of the present disclosure.

FIG. 2 illustrates a beamforming procedure of a network node in a beamforming system according to an embodiment of the present disclosure.

Referring to FIG. 2, the network node 150 performs data transmission/reception for a service, the minimum service quality requirement of which is MCS level n, in step 201. The network node 150 checks in step 203 whether a preset beamforming training period arrives or not during data transmission/reception for the corresponding service. If the preset beam period arrives, the network node may proceed to step 211 and determine that the situation requires beamforming training.

On the other hand, when the preset beam period has not arrived, the network node 150 checks in step 205 whether a link change is detected or not during data transmission/reception for the corresponding service. For example, the network node 150 may determine whether a link change is detected or not on the basis of intensity of reception of signals, including data for the service, whether data transmission is successful or not, whether data reception is successful or not, a channel quality factor value indicating a link performance, etc. When a link change is not detected, the network node 150 may return to step 201 and re-perform the following steps.

When a link change is detected, the network node 150 measures a performance with respect to a channel link with another network node in step 207. For example, the network node may measure at least one among EVM, SINR, RSSI, PER, and Tput.

Then, the network node 150 checks in step 209 whether the state of the channel with the another network node satisfies a beamforming training performing condition or not, on the basis of the measured link performance. That is, the network node 150 compares a channel quality factor value, which indicates the measured channel link performance, with a reference value, which has been set with respect to a beamforming training performing condition, thereby checking whether the beamforming training performing condition is satisfied or not. When a beamforming training performing condition has been set, for example, as illustrated in FIG. 3, the network node may: measure PER as the performance of a channel link; compare the measured PER with $PER_{th1}$, which has been set with respect to a beamforming training performing condition; and determine, when the measured PER value is less than or equal to $PER_{th1}$, that the beamforming training performing condition is satisfied or determine, when the measured PER value is larger than $PER_{th1}$, that the beamforming training performing condition is not satisfied. The PER is a channel quality factor value capable of specifically indicating the degree of satisfaction experienced by the user in connection with a service, although it has been assumed herein, for example, that it is checked whether the beamforming training performing condition is satisfied or not using the PER, it is also possible to check whether the beamforming training performing condition is satisfied or not using another channel quality factor value or multiple channel quality factor values. For example, it is possible to check whether the beamforming training performance condition is satisfied or not using at least one among EVM, SINR, RSSI, PER, and Tput. The network node 150 returns to step 201 and re-performs the following steps, when the state of the channel with the another network node does not satisfy the beamforming training performing condition.

When the state of the channel with the another network node satisfies the beamforming training performing condition, the network node 150 detects in step 211 that the situation requires a change in the data transmission/reception beam, due to deterioration of service quality, and determines that the situation requires beamforming training for a change in the transmission/reception beam.

Then, the network node 150 checks in step 213 whether the channel state satisfies the first beamforming training selection condition or not. For example, the network node 150 compares a channel quality factor value, which indicates a channel link performance measured through step 207, with a reference value, which has been set with respect to the first beamforming training selection condition, thereby checking whether the first beamforming training selection condition is satisfied or not. When reference values regarding the first beamforming training selection condition have been set as minimum values which enable the use of MCS level n, the network node may determine whether or not to use MCS level n on the basis of a result of a comparison between the measured channel quality factor value and a reference value that has been set with respect to the first beamforming training selection condition. When the first beamforming training selection condition has been set, for example, as illustrated in FIG. 3, the network node 150 may: measure EVM as the performance of a channel link; compare the measured EVM with EVM, which has been set with respect to a beamforming training performing condition; and determine, when the measured EVM value is larger than or equal to $EVM_{th2}$, that the first beamforming training selection condition is satisfied and that MCS level n is available or determine, when the measured EVM value is less than $EVM_{th2}$, that the first beamforming training selection condition is not satisfied and that MCS level n is unavailable. The EVM is a channel quality factor value which has a high degree of correlation with the PER, and may indicate the degree of satisfaction experienced by the user in connection with a service. Although it has been assumed herein, for example, that it is checked whether the first beamforming training selection condition is satisfied or not using the EVM, it is also possible to check whether the first beamforming training selection condition is satisfied or not using another channel quality factor value or multiple channel quality factor values.

When the channel state satisfies the first beamforming training selection condition, the network node 150 proceeds to step 215, selects a BT beamforming training selection scheme, and determines to use a second-step beam width size. The second-step beam width size, in this connection, refers to a beam width size that has the second largest size among beam width sizes defined in multiple steps, and it is also possible to use, according to the embodiment, a beam width size of a different step for the BT beamforming training scheme. Then, the network node 150 proceeds to step 217, performs BT beamforming training using a transmission/reception beam having a second-step beam width size, and proceeds to following step 229. At this time, the network node 150 may select an optimal transmission/reception beam with regard to the another network node through BT beamforming training and continuously perform service data transmission/reception, which has been performed in step 201, using the selected transmission/reception beam.

Meanwhile, when the channel state does not satisfy the first beamforming training selection condition, the network node 150 proceeds to step 219 and checks whether the channel state satisfies the second beamforming training selection condition or not. For example, the network node 150 compares a channel quality factor value, which indicates a channel link performance measured through step 207, with a reference value, which has been set with respect to the second beamforming training selection condition, thereby checking whether the second beamforming training selection condition is satisfied or not. When reference values regarding the second beamforming training selection condition have been set as minimum values which enable the use of MCS level 0, the network node 150 may determine whether or not to use MCS level 0 on the basis of a result of a comparison between the measured channel quality factor value and a reference value that has been set with respect to the second beamforming training selection condition. When the second beamforming training selection condition has been set, for example, as illustrated in FIG. 3, the network node 150 may: measure EVM as the performance of a channel link; compare the measured EVM with $EVM_{th3}$, which has been set with respect to a beamforming training performing condition; and determine, when the measured EVM value is larger than or equal to $EVM_{th3}$, that the second beamforming training selection condition is satisfied and that MCS level n is available or determine, when the measured EVM value is less than $EVM_{th3}$, that the second beamforming training selection condition is not satisfied and that MCS level n is unavailable. The EVM is a channel quality factor value which has a high degree of correlation with the PER, and may indicate the degree of satisfaction experienced by the user in connection with a service. Although it has been assumed herein, for example, that it is checked whether the second beamforming training selection condition is satisfied or not using the EVM, it is also possible to check whether the second beamforming training selection condition is satisfied or not using another channel quality factor value or multiple channel quality factor values.

Figure 4C:
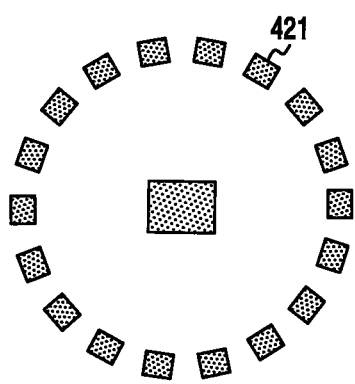
FIG. 4C is a diagram illustrating a beam shape of another network node for beamforming training according to an embodiment of the present disclosure.

When the channel state does not satisfy the second beamforming training selection condition, the network node 150 proceeds to step 221, selects a SLS beamforming training scheme, and determines to use a first-step beam width size. The first-step beam width size, in this connection, refers to a beam width size that has the largest size among beam width sizes defined in multiple steps, and it is also possible to use, according to the embodiment, a beam width size of a different step for the SLS beamforming training scheme. Then, the network node 150 proceeds to step 223, performs SLS beamforming training using a transmission/reception beam having a first-step beam width size, and proceeds to following step 229. At this time, the network node 150 may select an optimal transmission/reception beam with regard to the another network node through SLS beamforming training and continuously perform service data transmission/reception, which has been performed in step 201, using the selected transmission/reception beam. In addition, when the network node 150 performs SLS beamforming training, the another network node is supposed to have the same gain in all directions, without forming a specific beam direction, as illustrated in FIG. 4C.

Meanwhile, when the channel state satisfies the second beamforming training selection condition, the network node 150 proceeds to step 225, selects a BRP beamforming training scheme, and determines to use a first-step beam width size. The first-step beam width size, in this connection, refers to a beam width size that has the largest size among beam width sizes defined in multiple steps, and it is also possible to use, according to the embodiment, a beam width size of a different step for the BRP beamforming training scheme. Then, the network node 150 proceeds to step 227, performs BRP beamforming training using a transmission/reception beam having a first-step beam width size, and proceeds to following step 229. At this time, the network node 150 may select an optimal transmission/reception beam with regard to the another network node through BRP beamforming training and continuously perform service data transmission/reception, which has been performed in step 201, using the selected transmission/reception beam.

Then, the network node 150 checks in step 229 whether the channel state regarding the transmission/reception beam selected based on beamforming training satisfies a beamforming training repetition condition or not. That is, the network node 150 measures a channel quality factor value which indicates a channel link performance regarding the transmission/reception beam selected by performing a BT beamforming training in step 217, a SLS beamforming training in step 223, or BRP beamforming training in step 227, and compares the measured channel quality factor value with a reference value which has been set with respect to the beamforming training repetition condition, thereby checking whether the beamforming training repetition condition is satisfied or not. When reference values regarding the beamforming training repetition condition have been set as minimum values which enable the use of MCS level n, the network node 150 may determine whether or not to use MCS level n on the basis of a result of a comparison between the measured channel quality factor value and a reference value that has been set with respect to the beamforming training repetition condition. When the beamforming training repetition condition has been set, for example, as illustrated in FIG. 3, the network node 150 may measure EVM as the performance of a channel link; compare the measured EVM with $EVM_{th4}$, which has been set with respect to a beamforming training performing condition; and determine, when the measured EVM value is less than $EVM_{th4}$, that the beamforming training repetition condition is not satisfied and that MCS level n is available or determine, when the measured EVM value is less than or equal to $EVM_{th4}$, that the beamforming training repetition condition is satisfied and that MCS level n is unavailable. The EVM is a channel quality factor value which has a high degree of correlation with the PER, and may indicate the degree of satisfaction experienced by the user in connection with a service. Although it has been assumed herein, for example, that it is checked whether the beamforming training repetition condition is satisfied or not using the EVM, it is also possible to check whether the beamforming training repetition condition is satisfied or not using another channel quality factor value or multiple channel quality factor values.

If the channel state regarding the transmission/reception beam selected based on beamforming training does not satisfy the beamforming training repetition condition, the network node 150 continuously performs data transmission/reception for the service through the transmission/reception beam, which has been selected based on beamforming training, and terminates the procedure according to an embodiment of the present disclosure.

Meanwhile, when the channel state regarding the transmission/reception beam selected based on beamforming training satisfies the beamforming training repetition condition, the network node 150 may select to repeatedly perform the corresponding beamforming training in step 231 and reduce the beam width size. For example, when BRP beamforming training has been performed previously with a first-step beam width size, the network node 150 may determine to re-perform the BRP beamforming training with a second-step beam width size, which has a beam width size smaller than that of the first-step beam width size. As another example, when SLS beamforming training has been performed previously with a first-step beam width size, the network node 150 may determine to re-perform the SLS beamforming training with a second-step beam width size, which has a beam width size smaller than that of the first-step beam width size. As another example, when a BT beamforming training has been performed with a second step beam width size before, the network node 150 may determine to re-perform a BT beamforming training with a third step beam width size having a beam width size which is smaller than a second step beam width size. As another embodiment, when beamforming training is repeatedly performed, the network node 150 may select a beamforming training scheme different from the previous beamforming training scheme. For example, when SLS beamforming training has previously been performed, it is possible to select a BRP beamforming training scheme and to determine that beamforming training will be repeated.

Then, the network node 150 repeatedly performs the corresponding beamforming training with the reduced beam width size in step 233. Accordingly, the network node 150 may re-select the optimum transmission/reception beam with the another network node and may continuously perform service data transmission/reception, which has been performed in step 201, using the re-selected transmission/reception beam. Then, the network node 150 terminates the procedure according to an embodiment of the present disclosure.

Each of the above-described beamforming training schemes (SLS, BRP, BT) may be implemented by a hardware element, a software element, or a combination of hardware and software elements. According to an embodiment, it is possible to implement each beamforming training scheme using a hardware element and to define a separate state for beamforming training, which is distinguished from a normal data transmission state and a data reception state, with regard to the hardware element. For example, it is possible to define a beamforming state on a FSM (Finite State Machine), which is a hardware element. Such a definition of a separate beamforming state on a hardware element is advantageous in that, during BRP beamforming training, an interval of 3 us can be guaranteed between BRP frames.

According to various embodiments of the present disclosure, a method for beamforming training by a network node in a communication system may include measuring at least one channel quality factor value indicating a performance of a channel link with another network node, selecting a beamforming training scheme on the basis of the measured channel quality factor value, and performing beamforming training with the another network node according to the selected beamforming training scheme.

According to various embodiments of the present disclosure, the performing of beamforming training with the another network node by means of the selected beamforming training scheme may include determining a beam width on the basis of the selected beamforming training scheme, forming multiple transmission/reception beams having the determined beam width and having directions different from each other, and transmitting/receiving a beamforming training signal, according to the selected beamforming training scheme, using the formed transmission/reception beams.

According to various embodiments of the present disclosure, the method by the network node may further include selecting a transmission/reception beam on the basis of a result of performing the beamforming training, forming a channel link with the another network node using the selected transmission/reception beam and performing communication, measuring at least one channel quality factor indicating a performance of the channel link using the selected transmission/reception beam, and determining whether or not to repeatedly perform beamforming training on the basis of the measured channel quality factor value and at least one reference channel quality factor value that has been set to determine whether or not to repeat beamforming training.

According to various embodiments of the present disclosure, at least one reference channel quality factor is set for each channel quality factor on the basis of a required service quality.

Additionally, according to various embodiments of the present disclosure, the method by the network node may further include determining at least one of a beam width and a beamforming training scheme, when it is determined to repeatedly perform the beamforming training, the beam width and the beamforming training scheme being supposed to be used when the beamforming training is repeatedly performed, and the beam width to be used when the beamforming training is repeatedly performed may be smaller than a beam width used for previous beamforming training.

Additionally, according to various embodiments of the present disclosure, when it is determined to repeatedly perform the beamforming training, the method by the network node may further include determining a beamforming training scheme to be used for repeatedly performing the beamforming training.

According to various embodiments of the present disclosure, selecting a beamforming training scheme on the basis of the measured channel quality factor value may include comparing the measured channel quality factor with at least one reference channel quality factor value that has been preset for each of multiple beamforming training schemes, and selecting one beamforming training scheme among the multiple beamforming training schemes on the basis of a result of the comparing.

According to various embodiments of the present disclosure, the method by the network node may further include determining whether or not to perform beamforming training on the basis of the measured channel quality factor value and at least one reference channel quality factor value that has been set to determine whether or not to perform beamforming training, and then selecting a beamforming training scheme may be performed when it is determined to perform the beamforming training.

According to various embodiments of the present disclosure, the beamforming training scheme may include at least one among a SLS (Sector Level Sweep) beamforming training scheme, a BRP (Beam Refinement Protocol) beamforming training scheme, and a BT (Beam Tracking) beamforming training scheme.

According to various embodiments of the present disclosure, the channel quality factor may include at least one among EVM (Error Vector Magnitude), SINR (Signal to Interference and Noise Ratio), RSSI (Received Signal Strength Indication), PER (Packet Error Rate), and Tput (Throughput).

According to various embodiments of the present disclosure, a device of a network node for beamforming training in a communication system may include a channel estimation unit configured to measure at least one channel quality factor value indicating a performance of a channel link with another network node and a beamforming control unit configured to select a beamforming training scheme on the basis of the measured channel quality factor value and conduct a control such that beamforming training with the another network is performed according to the selected beamforming training scheme.

According to various embodiments of the present disclosure, the beamforming control unit may determine a beam width on the basis of the selected beamforming training scheme, form multiple transmission/reception beams, which have the determined beam width and have directions different from each other, and conduct a control such that a beamforming training signal is transmitted/received according to the selected beamforming training scheme.

According to various embodiments of the present disclosure, the beamforming control unit may select a transmission/reception beam on the basis of a result of performing the beamforming training, form a channel link with the another network node using the selected transmission/reception beam and perform communication, control a function for measuring at least one channel quality factor value indicating a performance of the channel link using the selected transmission/reception beam, and determine whether or not to repeatedly perform beamforming training on the basis of the measured channel quality factor value and at least one reference channel quality factor value that has been set to determine or not to repeat beamforming training.

According to various embodiments of the present disclosure, at least one reference channel quality factor may be set for each channel quality factor on the basis of a required service quality.

According to various embodiments of the present disclosure, the beamforming control unit may determine a beam width, when it is determined to repeatedly perform the beamforming training, the beam width being supposed to be used when the beamforming training is repeatedly performed, and the beam width to be used when the beamforming training is repeatedly performed may be smaller than a beam width used for previous beamforming training.

According to various embodiments of the present disclosure, the beamforming control unit may determine a beamforming training scheme, when it is determined to repeatedly perform the beamforming training, the beamforming training scheme being supposed to be used when the beamforming training is repeatedly performed.

According to various embodiments of the present disclosure, the beamforming control unit may compare the measured channel quality factor value with at least one reference channel quality factor value that has been preset for each of multiple beamforming training schemes and select one beamforming training scheme among the multiple beamforming training schemes on the basis of a result of the comparison.

According to various embodiments of the present disclosure, the beamforming control unit may determine whether or not to perform beamforming training on the basis of the measured channel quality factor value and at least one reference channel quality factor value that has been set to determine whether or not to perform beamforming training.

According to various embodiments of the present disclosure, the beamforming training scheme may include at least one among a SLS (Sector Level Sweep) beamforming training scheme, a BRP (Beam Refinement Protocol) beamforming training scheme, and a BT (Beam Tracking) beamforming training scheme.

According to various embodiments of the present disclosure, the channel quality factor may include at least one among EVM (Error Vector Magnitude), SINR (Signal to Interference and Noise Ratio), RSSI (Received Signal Strength Indication), PER (Packet Error Rate), and Tput (Throughput).

Although the present disclosure has been described by the restricted embodiments and the drawings as described above, the present disclosure is not limited to the aforementioned embodiments and various modifications and alterations can be made from the descriptions by those skilled in the art to which the present disclosure pertains.

Operations according to an embodiment of the present disclosure may be implemented by a single controller. In this case, a program instruction for performing an operation implemented by various computers may be recorded in a computer-readable medium. The computer readable medium may include a program command, a data file, a data structure, and the like independently or in combination. The program command may be things specially designed and configured for the present disclosure, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When some or all of base stations or relays described in the present disclosure are implemented by a computer program, a computer-readable recording medium which has stored the computer program is also included in the present disclosure. Therefore, the scope of the present disclosure should not be defined as being limited to the embodiments, but should be defined by the appended claims and equivalents thereof.

Although specific exemplary embodiments have been described in the detailed description of the present disclosure, various change and modifications may be made without departing from the spirit and scope of the present disclosure. Therefore, the scope of the present disclosure should not be defined as being limited to the embodiments, but should be defined by the appended claims and equivalents thereof.

The invention claimed is:

1. A method for a network node in a communication system, the method comprising:
   measuring at least two types of factor values indicating at least two types of performances of a channel link between the network node and another network node;
   selecting a beamforming training scheme from a plurality of beamforming training schemes based on the at least two types of factor values;
   performing beamforming training with the another network node according to the selected beamforming training scheme;
   selecting a transmission beam based on a result of performing the beamforming training;
   forming a channel link with the another network node using the selected transmission beam;
   performing communication with the another network node via the channel link;
   measuring at least two types of factor values indicating at least two types of performances of the channel link using the selected transmission beam; and
   determining whether to repeatedly perform beamforming training based on the at least two types of factor values indicating the at least two types of performances of the channel link using the selected transmission beam and at least two types of reference factor values.

2. The method of claim 1, wherein performing the beamforming training with the another network node comprises:
   determining a beam width and direction of at least one beam based on the selected beamforming training scheme; and
   transmitting, through the at least one beam, a beamforming training signal to the another network node.

3. The method of claim 1, further comprises:
   determining a beam width and a beamforming training scheme, if it is determined to repeatedly perform the beamforming training,
   wherein the beam width is smaller than a beam width used for previous beamforming training.

4. The method of claim 1, wherein the at least two types of reference factor values are set for each type of channel quality factor based on at least two types of required service qualities.

5. The method of claim 1, wherein selecting the beamforming training scheme based on the at least two types of factor values comprises:
   comparing the measured at least two types of factor values with at least two types of reference factor values that have been preset; and
   selecting one beamforming training scheme among a plurality of beamforming training schemes based on the comparison.

6. The method of claim 1, wherein the plurality of beamforming training schemes comprise at least two of a sector level sweep (SLS) beamforming training scheme, a beam refinement protocol (BRP) beamforming training scheme, and a beam tracking (BT) beamforming training scheme.

7. The method of claim 1, wherein the at least two types of factor values comprise at least two of error vector magnitude (EVM), signal to interference and noise ratio (SINR), received signal strength indication (RSSI), packet error rate (PER), and Throughput (Tput).

8. An apparatus of a network node in a communication system, the apparatus comprising:
   at least one transceiver; and
   at least one processor operatively coupled to the at least one transceiver,
   wherein the at least one processor is configured to:
      measure at least two types of factor values indicating at least two types of performances of a channel link between the network node and another network node;
      select a beamforming training scheme from a plurality of beamforming training schemes based on the at least two types of factor values;
      perform beamforming training with the another network node according to the selected beamforming training scheme;
      select a transmission beam based on a result of performing the beamforming training;
      form a channel link with the another network node using the selected transmission beam;
      perform communication with the another network node via the channel link;
      measure at least two types of factor values indicating at least two types of performances of the channel link using the selected transmission beam; and
      determine whether to repeatedly perform beamforming training based on the at least two factor values indicating the at least two types of performances of the channel link using the selected transmission beam and at least two types of reference factor values.

9. The apparatus of claim 8, wherein the at least one processor is configured to:
   determine a beam width and direction of at least one beam based on the selected beamforming training scheme; and
   transmit, through the at least one beam, a beamforming training signal, to the another network node.

10. The apparatus of claim 8, wherein the at least one processor is further configured to:
    determine a beam width and a beamforming training scheme, if it is determined to repeatedly perform the beamforming training,
    wherein the beam width is smaller than a beam width used for previous beamforming training.

11. The apparatus of claim 8, wherein the at least two types of reference factor values are set for each type of channel quality factor based on at least two of required service qualities.

12. The apparatus of claim 8, wherein the at least one processor is configured to:
    compare the measured at least two types of factor values with at least two types of reference factor values that have been preset; and
    select one beamforming training scheme among a plurality of beamforming training schemes based on the comparison.

13. The apparatus of claim 8, wherein the plurality of beamforming training schemes comprise at least two of a sector level sweep (SLS) beamforming training scheme, a beam refinement protocol (BRP) beamforming training scheme, and a beam tracking (BT) beamforming training scheme.

14. The apparatus of claim 8, wherein the at least two types of factor values comprise at least two of error vector magnitude (EVM), signal to interference and noise ratio (SINR), received signal strength indication (RSSI), packet error rate (PER), and Throughput (Tput).

15. An apparatus of a network node in a communication system, the apparatus comprising:
    at least one transceiver; and
    at least one processor operatively coupled to the at least one transceiver,
    wherein the at least one processor is configured to:
       measure at least two types of factor values indicating at least two types of performances of a channel link between the network node and another network node;
       select a beamforming training scheme from a plurality of beamforming training schemes based on the at least two types of factor values;
       perform beamforming training with the another network node according to the selected beamforming training scheme;
       receive, through at least one beam, a beamforming training signal, from the another network node;
       select a reception beam based on a result of performing the beamforming training;
       form a channel link with the another network node using the selected reception beam;
       perform communication with the another network node via the channel link;
       measure at least two types of factor values indicating at least two types of performances of the channel link using the selected reception beam; and
       determine whether to repeatedly perform beamforming training based on the at least two types of factor values indicating the at least two types of performances of the channel link using the selected reception beam and at least two types of reference factor values,
    wherein a beam width and direction of the at least one beam is determined based on the selected beamforming training scheme.

16. The apparatus of claim 15, wherein the at least two types of factor values comprise at least one of error vector magnitude (EVM), signal to interference and noise ratio (SINR), received signal strength indication (RSSI), packet error rate (PER), and Throughput (Tput).

17. The apparatus of claim 15, wherein the plurality of beamforming training schemes comprise at least two of a sector level sweep (SLS) beamforming training scheme, a beam refinement protocol (BRP) beamforming training scheme, and a beam tracking (BT) beamforming training scheme.

\* \* \* \* \*